United States Patent
Joshi et al.

(10) Patent No.: US 9,608,854 B2
(45) Date of Patent: Mar. 28, 2017

(54) METHOD AND SYSTEM FOR AUTOMATIC EXECUTION OF SCRIPTS ON REMOTE AGENT-LESS CLIENT MACHINES

(71) Applicant: Infosys Limited, Bangalore (IN)

(72) Inventors: Rahul M. Joshi, Hyderabad (IN);
Manasa Juvvadi, Karimnagar (IN);
Gopi C. Krishna, Hyderabad (IN);
Radheshyam Srinivasan, Chennai (IN); Rekha Chinthakunta, Hyderabad (IN); Madhavi Rani, Secunderabad (IN)

(73) Assignee: Infosys Limited, Bangalore (IN)

( * ) Notice: Subject to any disclaimer, the term of this patent is extended or adjusted under 35 U.S.C. 154(b) by 526 days.

(21) Appl. No.: 13/891,120

(22) Filed: May 9, 2013

(65) Prior Publication Data
US 2013/0304803 A1    Nov. 14, 2013

(30) Foreign Application Priority Data
May 9, 2012  (IN) .......................... 1816/CHE/2012

(51) Int. Cl.
*H04L 29/06* (2006.01)
*H04L 29/08* (2006.01)
*G06Q 10/06* (2012.01)

(52) U.S. Cl.
CPC ....... *H04L 29/06047* (2013.01); *G06Q 10/06* (2013.01); *H04L 67/34* (2013.01)

(58) Field of Classification Search
CPC ......... H04L 41/12; H04L 41/22; H04L 41/46; H04L 41/0213; H04L 41/0253;
(Continued)

(56) References Cited

U.S. PATENT DOCUMENTS

2006/0004830 A1*   1/2006  Lora et al. .................... 707/102
2008/0225710 A1*   9/2008  Raja et al. ................. 370/230.1
(Continued)

FOREIGN PATENT DOCUMENTS

JP        2003256958 A      9/2003

OTHER PUBLICATIONS

Remote System Monitoring, 24/7 Remote Monitoring Service Improves Uptime and Workflow, Merge Healthcare.
(Continued)

*Primary Examiner* — Nicholas Taylor
*Assistant Examiner* — Michael Li
(74) *Attorney, Agent, or Firm* — Klarquist Sparkman, LLP

(57) ABSTRACT

The present invention provides a system to automatically schedule at least one workflow and deploy at least one executable across one or more target remote agent-less client machines via a secured connection. The system may include a workflow generator and a script runner. The workflow generator is configured to receive at least one script that has to be executed across one or more target remote agent-less client machine and parameters as input from user, generate at least one optimized decision support workflow based on the input parameters from the user, and map the generated at least one optimized decision support workflow to one or more target remote agent-less client machine. The script runner retrieves the at least one optimized decision support workflow that is mapped with one or more target remote agent-less client machine and executes the at least one script in one or more target remote agent-less client machine.

31 Claims, 3 Drawing Sheets

(58) Field of Classification Search
CPC ....... H04L 43/00; H04L 67/02; H04L 67/025; H04L 12/2602; H04L 29/06047; H04L 41/046; H04L 41/0803; H04L 47/10; H04L 67/34; G06F 11/3006; G06F 11/0709; G06F 11/0781; G06F 11/3495; G06F 11/0727; G06F 11/3055; G06F 11/3089; G06F 9/505; G06Q 10/06; G06Q 30/0603
See application file for complete search history.

(56) References Cited

U.S. PATENT DOCUMENTS

2008/0301267 A1* 12/2008 Chang et al. ................. 709/220
2009/0187929 A1* 7/2009 Kushwaha et al. ........... 719/330
2010/0131473 A1* 5/2010 Bjork et al. .................. 707/690

OTHER PUBLICATIONS

File Guru, My Server Observer 1.1, 2000-2010, http://www.fileguru.com/My-Server-Observer/info.

* cited by examiner

METHOD AND SYSTEM FOR AUTOMATIC EXECUTION OF SCRIPTS ON REMOTE AGENT-LESS CLIENT MACHINES

RELATED APPLICATION DATA

This application claims priority to Indian Patent Application No. 1816/CHE/2012, filed May 9, 2012, which is hereby incorporated by reference in its entirety.

BACKGROUND

The invention in general relates to tools to manage job scheduling and execution on a grid infrastructure. In particular, the invention relates to a method and system for automatic execution of scripts on remote agent-less client machines.

Grid computing is defined as a mechanism to overcome heterogeneity of computing elements, operating systems and policy decisions and environment. The long-term vision of the enterprise grid computing community is non-dedicated, seamless interoperability of disparate systems that may be part of the same organization or different organizations. Grid computing is looked upon by many experts as a technology that can change the world, like the internet. But from the user's point of view, grid is nothing but a computer with a huge amount of computing resource. Many applications in domains like Life sciences, Energy, Finance etc. require huge resources to run compute-intensive jobs through a business workflow. Therefore, there is a need for business level workflow definitions integrated with run book automation tool to interact with the underlying heterogeneous grid infrastructure and execute scripts or jobs comprising the workflow across the infrastructure.

However, most of the run book automation tool required agent to be installed on the target machines or plug-in to be integrated with the tool for establishing connection between the central server and target machines and to execute the jobs present in the workflows in the target machine.

There has to be a system and a method to generate workflow definitions and execute scripts on target machines without plug-in integration with the system and agent installation on the target machines.

Thus, there is a need for a system and a method that automatically generates workflows and executes scripts on target remote agent-less client machines without requiring plug-in integration with the system.

SUMMARY OF THE INVENTION

The present invention provides a system to automatically schedule at least one workflow and deploy at least one executable across one or more target remote agent-less client machines via a secured connection. The system includes a workflow generator configured to receive at least one script that has to be executed across one or more target remote agent-less client machine and parameters as input from user, generate at least one optimized decision support workflow based on the input parameters from the user, and map the generated at least one optimized decision support workflow to one or more target remote agent-less client machine. The system further includes a script runner to retrieve the at least one optimized decision support workflow that is mapped with one or more target remote agent-less client machine and executes the at least one script in one or more target remote agent-less client machine.

The present invention further provides a method to automatically schedule at least one workflow and deploy at least one executable across one or more target remote agent-less client machines via a secured connection. The method includes receiving at least one script that has to be executed across one or more target remote agent-less client machine and parameters as input from a user, generating at least one optimized decision support workflow based on the input script and parameters, mapping the at least one optimized decision support workflow to one or more target remote agent-less client machines and executing the at least one script in one or more target remote agent-less client machine.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
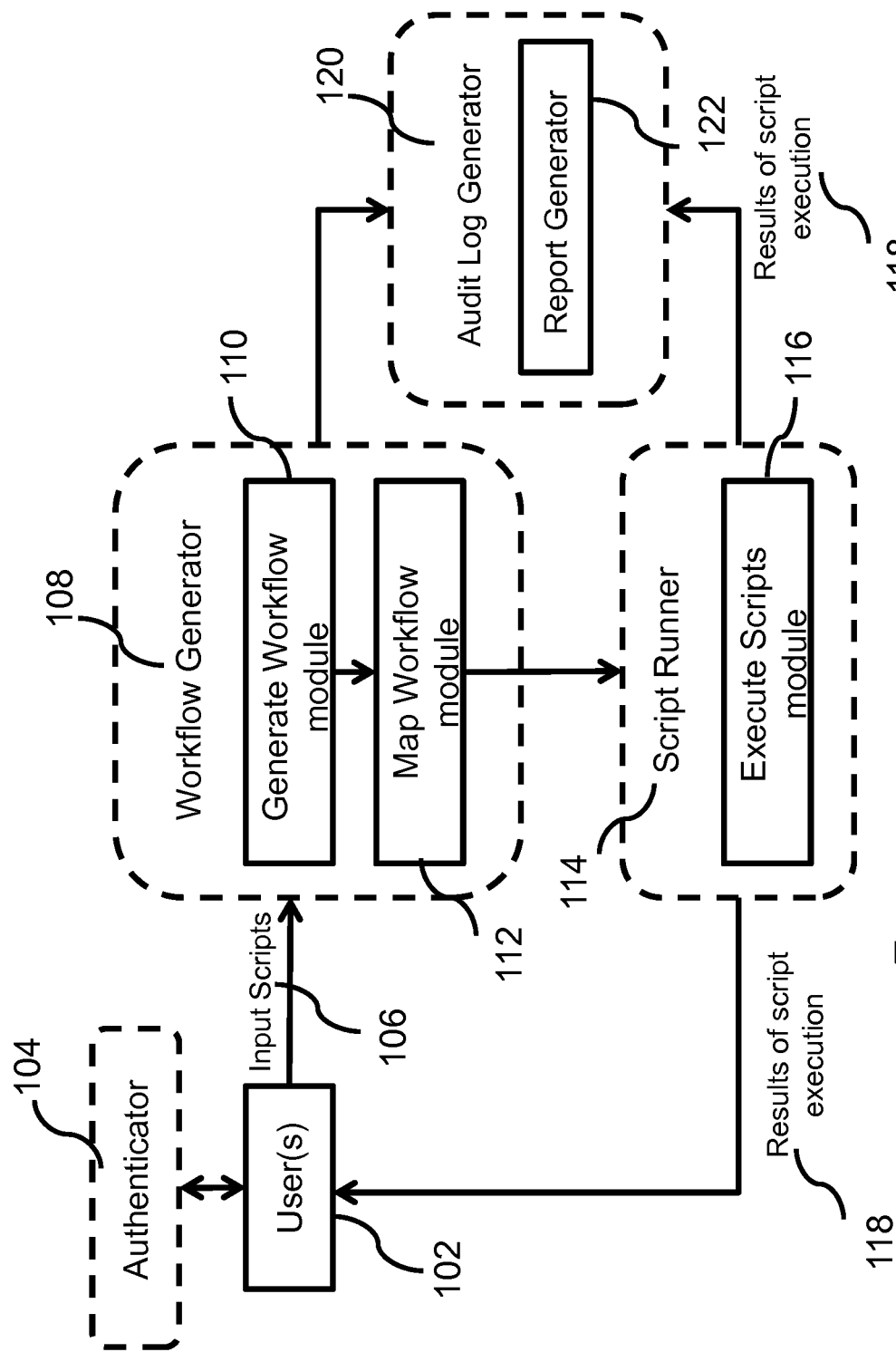
FIG. 1 is a block diagram of a system 100 illustrating interaction between one or more users and various components of system 100 configured to automatically generate one or more workflows and execute one or more scripts on one or more remote agent-less machines, in accordance with an embodiment of the present invention.

FIG. 1 is a block diagram of a system 100 illustrating interaction between one or more users 102 and various components of system 100 configured to automatically generate one or more workflows and execute one or more scripts on one or more remote agent-less machines, in accordance with an embodiment of the present invention. The system 100 is a web based run book automation tool configured to execute scripts and executables across multiple platforms via a secured communication protocol. There are many types of secured communication protocols and the selection of the secured communication protocol is based on the operating system in which the system 100 is deployed.

For example the communication protocol could be Secure Shell (SSH) Protocol, if the system 100 is deployed in UNIX operating system, or psexec protocol, if the system 100 is deployed in Windows operating system. The system 100 as depicted in FIG. 1 includes the following components: an authenticator 104, a workflow generator 108, a script runner 114, an audit log generator 120 and a report generator 122.

Authenticator 104 authenticates one or more users 102 logging into the system 100 and provides access privileges to one or more valid users based on their role. The access privileges for one or more users based on their role restrict unprivileged users in accessing and initiating critical activities in the system 100.

Workflow generator 108 generates one or more optimized decision support workflows that can be carried out on a grid infrastructure based on one or more input scripts 106 obtained from one or more users. Workflow generator 108 includes the following modules: Generate workflow module 110 and Map workflow module 112.

Generate workflow module 110 receives one or more input scripts 106 from one or more users. Each input script 106 in the generate workflow module 110 consists of at least one project requirement and at least one system configuration information as input parameters, wherein said at least one project requirement could be one of a project code or a remote agent-less client machine detail, and said at least one system configuration comprises operating system information of the remote agent-less client machine. The project code comprises a unique code to identify project group and the remote agent-less client machine detail comprises a machine IP address.

The generate workflow module 110 resolves dependency of one or more input scripts 106 based on the input parameters and generates optimized decision support workflow which provides dynamic support while executing a workflow.

Map workflow module 112 retrieves one or more generated optimized decision support workflow and maps it to one or more remote agent-less client machine based on the input parameters.

Script runner 114 retrieves one or more optimized decision support workflow mapped with one or more remote agent-less client machines from the map workflow module 112. Script runner 114 consists of execute scripts module 116.

Execute scripts module 116 executes one or more input scripts 106 on mapped one or more remote agent-less client machines based on the retrieved optimized decision support workflow. Results of script execution 118 are recorded by the execute scripts module 116 and notified to one or more users 102 and audit log generator 120. The results of script execution 118 could be success for successful execution of scripts on the respective remote agent-less client machine or failure for failed execution of scripts on the respective remote agent-less client machine. Script runner 114 does not require any plug-in integration or any agent installation on target client machine to track the results of script execution 118 and communicating it to one or more users 102.

Audit log generator 120 retrieves the results of script execution 118 from the execute scripts module 116 of the script runner 114 and records an audit log comprising a transaction information. The transaction information comprises user information, timestamp and status of the transaction from workflow generation to execution of scripts, wherein said user information comprises information regarding one or more users responsible for initiating a workflow generation and script execution, and said status of the transaction comprises success or failure results of script execution 118. Audit log generator further comprises a report generator 122.

Report generator 122 retrieves one or more audit logs recorded by the audit log generator 120 and generates one or more reports based on the selection by one or more users 102 on each reporting period, wherein the reporting period is a group consisting of a day, a week, a month, a quarter and a year.

Figure 2:
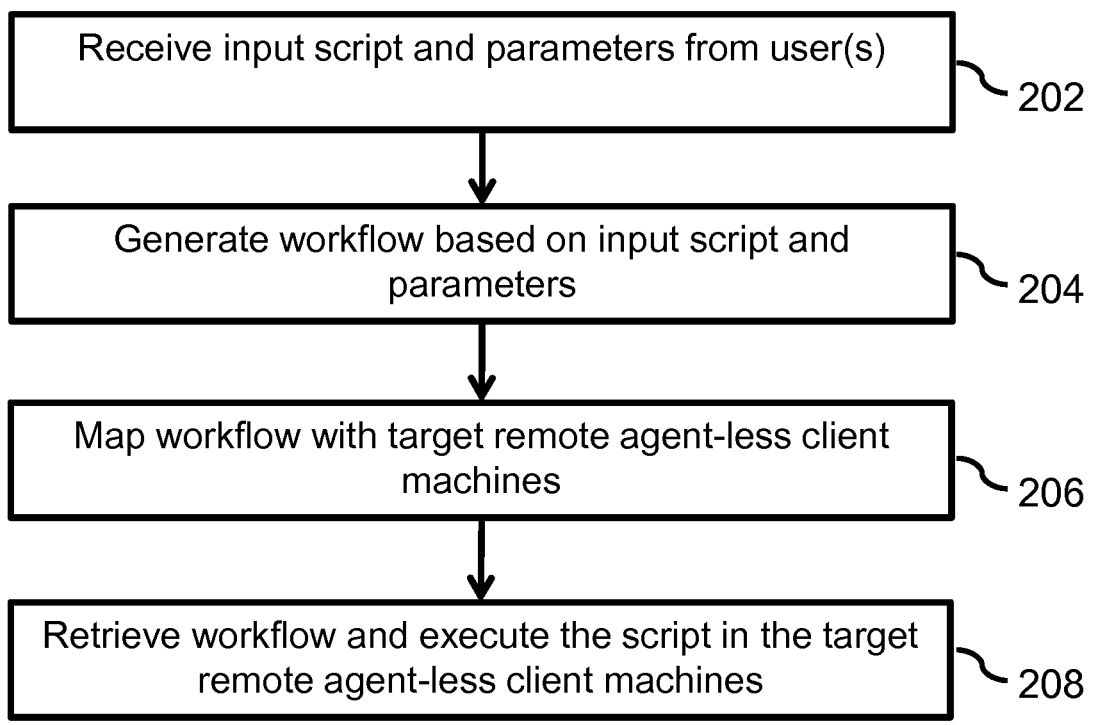
FIG. 2 is a flowchart illustrating a method for automatically generating one or more workflows and executing one or more scripts on one or more target remote agent-less machines, in accordance with an embodiment of the present invention.

FIG. 2 is a flowchart describing a method for automatically generating one or more workflows and executing one or more scripts on one or more target remote agent-less client machines, in accordance with an embodiment of the present invention.

The process of automatically generating one or more workflows and executing one or more scripts on one or more target remote agent-less client machines, involves the following steps:

At step 202, receive one or more input scripts to be executed on one or more target remote agent-less client machines along with input parameters from one or more users. Each input parameter consists of at least one project requirement and at least one system configuration information, wherein said at least one project requirement could be one of a project code or a remote agent-less client machine detail and said at least one system configuration comprises operating system information of the remote agent-less client machine. The project code comprises a unique code to identify project group and the remote agent-less client machine detail comprises a machine IP address.

At step 204, generate one or more optimized decision support workflow based on one or more input scripts and one or more input parameters wherein the one or more optimized decision support workflow resolves dependency of one or more input scripts to be executed on one or more target remote agent-less client machines and provides dynamic support during the execution of one or more scripts on the target remote agent-less client machines.

At step 206, map the one or more optimized decision support workflow generated in step 204, with the target remote agent-less client machines.

At step 208, retrieve one or more optimized decision support workflow that is mapped with the target remote agent-less client machines and execute one or more input scripts in the target remote agent-less client machines.

Exemplary Computing Environment

Figure 3:
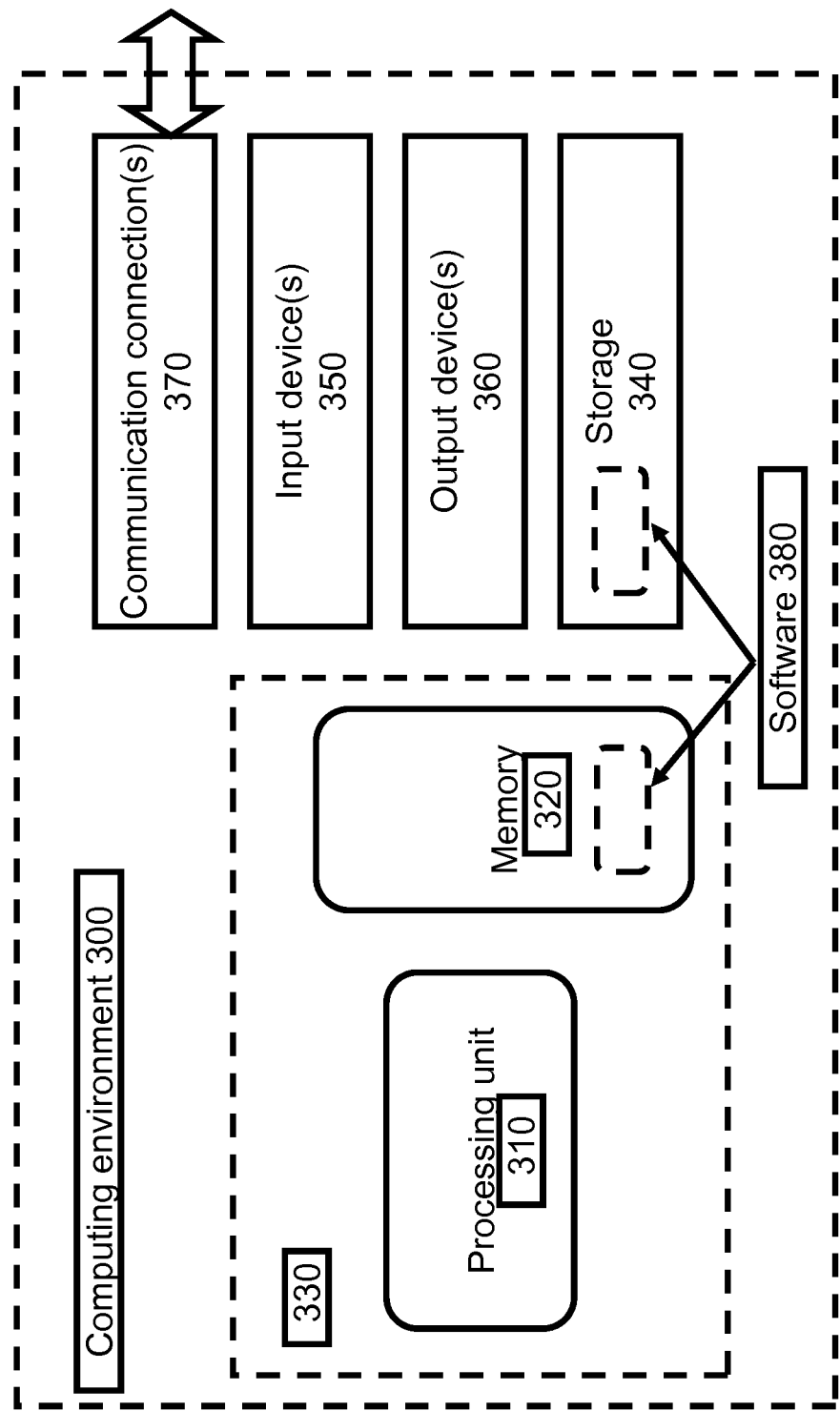
FIG. 3 illustrates a generalized example of a computing environment 300.

One or more of the above-described techniques can be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which can be used to store information and which can be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A system to automatically execute at least one executable script across one or more remote agent-less client machines via a secured connection, comprising:
    one or more processors; and
    one or more memories operatively coupled to at least one of the one or more processors and having instructions stored thereon that, when executed by at least one of the one or more processors, cause at least one of the one or more processors to:
        receive at least one computer executable script from a user, wherein the at least one computer executable script comprises computer executable code;
        generate at least one support workflow based on the at least one computer executable script and one or more parameters, input by a user, wherein the one or more parameters comprises at least one of a project requirement and at least one system configuration; and
        mapping execution of the at least one computer executable script to one or more remote agent-less machines; and
        execute the at least one computer executable script in the one or more remote agent-less client machines based on the support workflow.

2. The system of claim 1, wherein the at least one computer executable script contains encoded instructions for the one or more remote agent-less machines to perform an indicated task.

3. The system of claim 1, wherein the support workflow enables decision making by at least one of the one or more remote agent-less client machines, in order to execute the computer executable script to perform an operation in a changing environment.

4. The system of claim 1, wherein the one or more parameters comprises at least one project requirement, at least one system configuration, or one or more arguments as input to the at least one computer executable script.

5. The system of claim 4, wherein the at least one project requirement is one of a project code and a client machine identification detail.

6. The system of claim 4, wherein the at least one system configuration comprises platform information associated with one or more remote agent-less client machines.

7. The system of claim 1, wherein the instructions when executed by at least one of the one or more processors, further cause at least one of the one or more processors to authenticate one or more users and provide role based access privileges to the users.

8. The system of claim 1, wherein the instructions when executed by at least one of the one or more processors, further cause at least one of the one or more processors to generate at least one audit log comprising transaction information.

9. The system of claim 8, wherein the transaction information comprises information describing the generation of at least one optimized decision support workflow and the execution of at least one computer executable script on the one or more remote agent-less client machines.

10. The system of claim 8, wherein the transaction information comprises user information, a timestamp and status of the transaction.

11. The system of claim 1, wherein the instructions when executed by at least one of the one or more processors, further cause at least one of the one or more processors to generate one or more reports for each reporting period, wherein the reporting period is at least one period selected from a group consisting of a day, a week, a month, a quarter and a year.

12. A computer-implemented method executed by one or more computing devices for executing at least one executable script across one or more remote agent-less client machines via a secured connection, the method comprising:
receiving, by at least one of the one or more computing devices, at least one computer executable script from a user, wherein the at least one computer executable script comprises computer executable code;
generating, by at least one of the one or more computing devices, at least one support workflow based on the at least one computer executable script and one or more parameters, input by a user, wherein the one or more parameters comprises at least one of a project requirement and at least one system configuration; and
mapping execution of the at least one computer executable script to one or more remote agent-less machines; and
executing, by at least one of the one or more computing devices, the at least one computer executable script in the one or more remote agent-less client machines based on the support workflow.

13. The computer-implemented method of claim 12, wherein the at least one computer executable script contains encoded instructions for the one or more remote agent-less machines to perform an indicated task.

14. The computer-implemented method of claim 12, wherein the support workflow enables decision making, by at least one of the one or more remote agent-less client machines, in order to execute the computer executable script to perform an operation in a changing environment.

15. The computer-implemented method of claim 12, wherein the one or more parameters comprises at least one project requirement, at least one system configuration, or one or more arguments as input to the at least one computer executable script.

16. The computer-implemented method of claim 15, wherein the at least one project requirement is one of a project code and a client machine identification detail.

17. The computer-implemented method of claim 15, wherein the at least one system configuration comprises platform information associated with one or more remote agent-less client machines.

18. The computer-implemented method of claim 12 further comprising, authenticating, by at least one of the one or more computing devices, one or more users and providing role based access privileges to the users.

19. The computer-implemented method of claim 12 further comprising, by at least one of the one or more computing devices, generating at least one audit log with transaction information.

20. The computer-implemented method of claim 19, wherein the transaction information comprises user information, a timestamp and status of the transaction.

21. The computer-implemented method of claim 12 further comprising generating, by at least one of the one or more computing devices, at least one report for each reporting period, wherein the reporting period is at least one period selected from a group consisting of a day, a week, a month, a quarter and a year.

22. A non-transitory computer readable medium storing a set of instructions for execution on a computing device to execute an executable script across one or more remote agent-less client machines via a secured connection, the set of instructions comprising instructions which, when executed by a processor of the computing device, cause the processor to:
authenticate one or more users;
receive at least one computer executable script from a user, wherein the at least one computer executable script comprises computer executable code;
generate at least one support workflow based on the at least one computer executable script and one or more parameters, input by a user, wherein the one or more parameters comprises at least one of a project requirement and at least one system configuration, and mapping execution of the at least one computer executable script to one or more remote agent-less machines; and
execute the at least one computer executable script in the one or more remote agent-less client machines based on the support workflow;
generate at least one audit log comprising transaction information; and
generate at least one report for each reporting period.

23. The computer program product of claim 22, wherein the at least one computer executable script contains encoded instructions for the one or more remote agent-less machines to perform an indicated task.

24. The computer program product of claim 22, wherein the authenticating of one or more users provides role based access privileges to the users.

25. The computer program product of claim 22, wherein the support workflow enables decision making, by at least one of the one or more remote agent-less client machines, in order to execute the computer executable script to perform an operation in a changing environment.

26. The computer program product of 22, wherein the one or more parameters comprises at least one project requirement, at least one system configuration, or one or more arguments as input to the at least one computer executable script.

27. The computer program product of claim 26, wherein the at least one project requirement is one of a project type and a client machine identification detail.

28. The computer program product of claim 26, wherein the at least one system configuration comprises platform information associated with one or more remote agent-less client machines.

29. The computer program product of claim 22, wherein transaction information comprises information describing the generation of at least one optimized decision support workflow followed by execution of at least one computer executable script on the one or more remote agent-less client machines.

30. The computer program product of claim 22, wherein the transaction information comprises user information, a timestamp and status of the transaction.

31. The computer program product of claim 22, wherein the reporting period is at least one period selected from a group consisting of a day, a week, a month, a quarter and a year.

* * * * *